US010650530B2

(12) United States Patent
Hever et al.

(10) Patent No.: US 10,650,530 B2
(45) Date of Patent: May 12, 2020

(54) METHOD OF VEHICLE IMAGE COMPARISON AND SYSTEM THEREOF

(71) Applicant: UVEYE LTD., Tel-Aviv (IL)

(72) Inventors: Amir Hever, Tel-Aviv (IL); Ohad Hever, Modiin (IL); Ilya Bogomolny, Tel-Aviv (IL)

(73) Assignee: UVEYE LTD., Tel-Aviv (IL)

( * ) Notice: Subject to any disclaimer, the term of this patent is extended or adjusted under 35 U.S.C. 154(b) by 147 days.

(21) Appl. No.: 15/940,172

(22) Filed: Mar. 29, 2018

(65) Prior Publication Data

US 2019/0304100 A1    Oct. 3, 2019

(51) Int. Cl.
| | |
|---|---|
| *G06K 9/34* | (2006.01) |
| *G06T 7/174* | (2017.01) |
| *G06T 7/143* | (2017.01) |
| *G06K 9/32* | (2006.01) |

(52) U.S. Cl.
CPC ............ *G06T 7/174* (2017.01); *G06K 9/3233* (2013.01); *G06T 7/143* (2017.01); *G06K 2209/23* (2013.01); *G06T 2207/20081* (2013.01); *G06T 2207/20084* (2013.01); *G06T 2207/30248* (2013.01)

(58) Field of Classification Search
None
See application file for complete search history.

(56) References Cited

U.S. PATENT DOCUMENTS 6,047,083 A * 4/2000 Mizuno ............ G01N 23/2251
382/141
9,153,079 B1 * 10/2015 Wood .................. G07C 5/0808
9,232,118 B1 * 1/2016 Mogre ..................... H04N 5/21
9,292,929 B2 * 3/2016 Hayata ..................... G06T 7/11
10,043,090 B2 * 8/2018 Tanaka ..................... G06K 9/46
(Continued)

FOREIGN PATENT DOCUMENTS

| CN | 106127747 A | 11/2016 |
|---|---|---|
| EP | 291112 A1 | 8/2015 |
| WO | 2012012576 A1 | 1/2012 |

OTHER PUBLICATIONS

Nvidia GTC Conference 2017, Oct. 18, 2017.

*Primary Examiner* — Feng Niu
(74) *Attorney, Agent, or Firm* — Browdy and Neimark, PLLC

(57) ABSTRACT

There are provided a system and method of vehicle image comparison, the method including: obtaining an input image capturing at least part of a vehicle; segmenting the input image into one or more input segments corresponding to one or more mechanical components; retrieving a set of reference images, thereby obtaining a respective set of corresponding reference segments for each input segment; and generating at least one difference map corresponding to at least one input segment, comprising, for each input segment: comparing the input segment with each corresponding reference segment thereof using a comparison model, giving rise to a set of difference map candidates each indicating probability of presence of DOI between the given input segment and the corresponding reference segment; and providing a difference map corresponding to the given input segment according to probability of each difference map candidate in the set of difference map candidates.

29 Claims, 5 Drawing Sheets

(56) References Cited

U.S. PATENT DOCUMENTS

| | | | |
|---|---|---|---|
| 10,127,458 B2* | 11/2018 | Singh | G06K 9/00785 |
| 10,255,526 B2* | 4/2019 | Gandenberger | G06K 9/0063 |
| 10,282,843 B2* | 5/2019 | Abedini | A61B 5/6898 |
| 10,311,561 B2* | 6/2019 | Ukishima | G06K 9/6202 |
| 2003/0058435 A1* | 3/2003 | Honda | G01N 21/9501 |
| | | | 356/237.1 |
| 2004/0057629 A1* | 3/2004 | Shikami | G01N 21/8851 |
| | | | 382/254 |
| 2006/0171593 A1* | 8/2006 | Hayakawa | G06T 7/001 |
| | | | 382/209 |
| 2013/0188878 A1* | 7/2013 | Kacenjar | G06T 3/0068 |
| | | | 382/209 |
| 2014/0105498 A1* | 4/2014 | Sethuraman | G06T 7/20 |
| | | | 382/180 |
| 2014/0226905 A1* | 8/2014 | Yahata | G06T 5/002 |
| | | | 382/194 |
| 2015/0269792 A1 | 9/2015 | Wood | |
| 2015/0294182 A1* | 10/2015 | Kenig | G06T 5/50 |
| | | | 382/132 |
| 2016/0178790 A1 | 6/2016 | Li et al. | |
| 2017/0154234 A1 | 6/2017 | Tanaka | |
| 2017/0213112 A1 | 7/2017 | Sach et al. | |
| 2017/0293894 A1 | 10/2017 | Taliwal et al. | |
| 2017/0359534 A1* | 12/2017 | Li | H04N 5/2258 |
| 2017/0372155 A1* | 12/2017 | Odry | G06K 9/03 |
| 2018/0225800 A1* | 8/2018 | Wang | G06K 9/2063 |
| 2019/0005361 A1* | 1/2019 | Cho | G06K 9/6277 |
| 2019/0205606 A1* | 7/2019 | Zhou | G06K 9/0014 |

* cited by examiner

METHOD OF VEHICLE IMAGE COMPARISON AND SYSTEM THEREOF

TECHNICAL FIELD

The presently disclosed subject matter relates, in general, to the field of vehicle image analysis, and more specifically, to methods and systems for vehicle image comparison.

BACKGROUND

Inspection of a motor vehicle is commonly performed manually by a technician. Images of a vehicle are sometimes captured for the purpose of assisting the manual inspection process and providing visual evidence of the inspection. This process is usually cumbersome and time-consuming.

In some cases, vehicle images are captured and analyzed for inspection purposes. Image registration is commonly used when analyzing an image with respect to a reference image. Known methods in this aspect are generally inefficient, error-prone and computationally costly.

GENERAL DESCRIPTION

In accordance with certain aspects of the presently disclosed subject matter, there is provided a computerized method of vehicle image comparison, comprising: obtaining an input image acquired by an imaging device capturing at least part of a vehicle; segmenting the input image into one or more input segments corresponding to one or more mechanical components comprised in the at least part of the vehicle using a segmentation model; retrieving a set of reference images, wherein each reference image within the set comprises at least one reference segment corresponding to at least one input segment of the one or more input segments, thereby obtaining a respective set of corresponding reference segments for each input segment of the at least one input segment; and generating at least one difference map corresponding to the at least one input segment, comprising, for each given input segment: comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and providing a difference map corresponding to the given input segment according to probability of each difference map candidate in the set of difference map candidates, the difference map indicating probability of presence of DOI in the given input segment.

In addition to the above features, the method according to this aspect of the presently disclosed subject matter can comprise one or more of features (i) to (xiii) listed below, in any desired combination or permutation which is technically possible:

(i). The method can further comprise combining the at least one difference map to a composite difference map indicating probability of presence of DOI in the input image.

(ii). The input image can be acquired by the imaging device at a first imaging condition, and at least one reference image within the set of reference images can be acquired at a second imaging condition different from the first imaging condition, thereby causing false alarm (FA) difference between the input image and the at least one reference image resulting from difference between the first and second imaging conditions.

(iii). The first and second imaging conditions can comprise one or more of the following: relative position between the vehicle and the imaging device, illumination condition, and speed of the vehicle.

(iv). The set of reference images can be retrieved using an instance descriptor uniquely identifying the vehicle in the input image.

(v). The set of reference images can be selected from a group comprising: a first set of images capturing the same instance of the vehicle, and a second set of images capturing similar instances of the vehicle.

(vi). The second set of images can be selected by: using an encoding model to obtain vector representation for each of the input image and candidate reference images, and selecting the second set of images using a similarity metric between the vector representation of the input image and each candidate reference image.

(vii). The segmentation model can be a segmentation deep learning model trained using a training dataset comprising a set of pre-segmented vehicle images according to mechanical components comprised therein.

(viii). The comparison model can be a comparison deep learning model trained using training dataset comprising a set of image pairs each including a target image and a reference image so as to be capable of identifying the DOI and excluding the FA difference in a difference map between each image pair.

(ix). Each difference map candidate in the set of difference map candidates can indicate segment-wise probability of presence of DOI between the given input segment and the corresponding reference segment. The providing can comprise selecting a difference map from the set of difference map candidates according to ranking of the probability of each difference map candidate in the set.

(x). Each difference map candidate in the set of difference map candidates can indicate pixel-wise probability of presence of DOI between the given input segment and the corresponding reference segment. The providing can comprise generating a difference map in which each pixel value is determined based on a corresponding pixel value in each difference map candidate in the set.

(xi). At least some of the pixels in the difference map can result from comparisons with different reference images.

(xii). Each reference image within the set can comprise one or more reference segments, and the method can further comprise for each reference image, performing a matching between the input segments and the reference segments to identify the at least one reference segment that corresponds to the at least one input segment.

(xiii). The method can further comprise marking one or more non-matching input segments identified in the matching as presence of DOI.

In accordance with other aspects of the presently disclosed subject matter, there is provided a computerized system of vehicle image comparison, the system comprising a processor and memory circuitry (PMC) operatively connected to an I/O interface, wherein: the I/O interface is configured to obtain an input image acquired by an imaging device capturing at least part of a vehicle; and the PMC is configured to: segment the input image into one or more input segments corresponding to one or more mechanical components comprised in the at least part of the vehicle using a segmentation model; retrieve a set of reference images, wherein each reference image within the set comprises at least one reference segment corresponding to at least one input segment of the one or more input segments, thereby obtaining a respective set of corresponding reference segments for each input segment of the at least one input segment; and generate at least one difference map corresponding to the at least one input segment, comprising, for each given input segment: comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and providing a difference map corresponding to the given input segment according to probability of each difference map candidate in the set of difference map candidates, the difference map indicating probability of presence of DOI in the given input segment.

This aspect of the disclosed subject matter can comprise one or more of features (i) to (xiii) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of vehicle image comparison, the method comprising: obtaining an input image acquired by an imaging device capturing at least part of a vehicle; segmenting the input image into one or more input segments corresponding to one or more mechanical components comprised in the at least part of the vehicle using a segmentation model; retrieving a set of reference images, wherein each reference image within the set comprises at least one reference segment corresponding to at least one input segment of the one or more input segments, thereby obtaining a respective set of corresponding reference segments for each input segment of the at least one input segment; and generating at least one difference map corresponding to the at least one input segment, comprising, for each given input segment: comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and providing a difference map corresponding to the given input segment according to probability of each difference map candidate in the set of difference map candidates, the difference map indicating probability of presence of DOI in the given input segment.

This aspect of the disclosed subject matter can comprise one or more of features (i) to (xiii) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
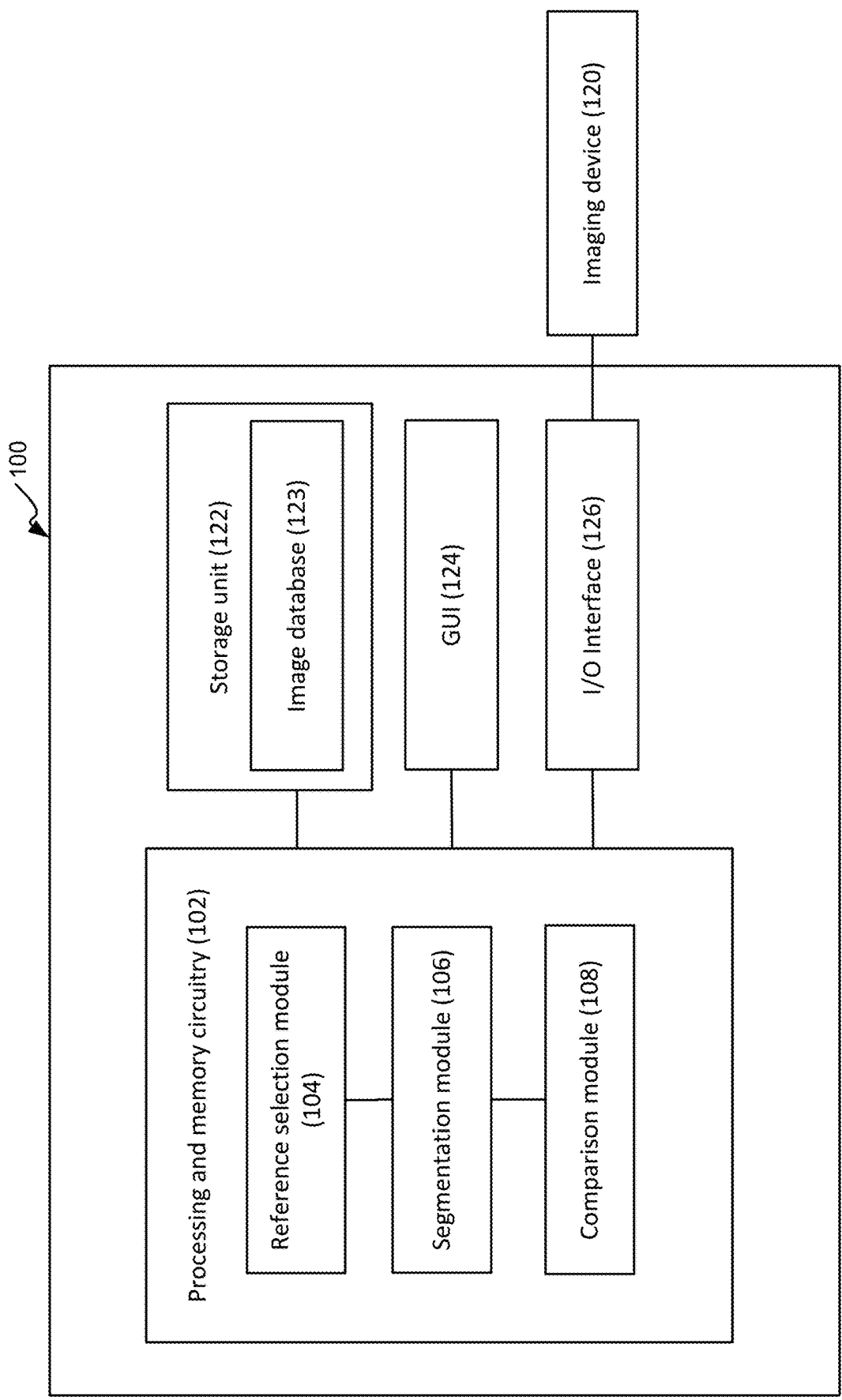
FIG. 1 schematically illustrates a block diagram of a computerized system capable of comparing vehicle images in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "comparing", "retrieving", "capturing", "segmenting", "generating", "using", "retrieving", "providing", "combing", "identifying", "causing", "encoding", "selecting", "training", "excluding", "ranking", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the vehicle image comparison system and the processing and memory circuitry (PMC) thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Bearing this in mind, attention is drawn to FIG. 1, schematically illustrating a block diagram of a computerized system capable of comparing vehicle images in accordance with certain embodiments of the presently disclosed subject matter.

The system 100 illustrated in FIG. 1 is a computer-based vehicle image comparison system. System 100 can be configured to obtain, via a hardware-based I/O interface 120, an input image (also termed as target image) acquired by an imaging device 120. The input image captures at least part of a vehicle. It is to be noted that the term "vehicle" used herein should be expansively construed to cover any kind of motor vehicle, including but not limited to cars, buses, motorcycles, trucks, trains, and airplanes, etc. The present disclosure is not limited by the type and usage of a specific vehicle, nor by the state of the vehicle being either static or in motion.

The imaging device 120 can be any kind of image acquisition device(s) or general-purpose device(s) equipped with image acquisition functionalities that can be used to capture vehicle images at a certain resolution and frequency, such as, e.g., a digital camera with image and/or video recording functionalities. In some embodiments, the imaging device can refer to one image acquisition device that is located at a given relative position with respect to the vehicle. The input image can refer to one or more images captured by the given image acquisition device from a given perspective. In some embodiments, the imaging device can refer to a plurality of imaging acquisition units which can be located at different relative positions with respect to the vehicle so as to capture images from different perspectives. In such cases, the input image should be understood as referring to one or more images acquired by each or at least some of the plurality of imaging acquisition units, as will be described in further detail below with reference to FIG. 2.

As illustrated, system 100 can comprise a processing and memory circuitry (PMC) 102 operatively connected to the I/O interface 126 and a storage unit 122. PMC 102 is configured to provide all processing necessary for operating system 100 which is further detailed with reference to FIGS. 2-3. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein. In some cases, system 100 can be operatively connected to one or more external data repositories (not shown separately).

The storage unit 122 can include an image database 123 which can be configured to store multiple previous scans/images of vehicle instances which can be previously processed (e.g., segmented). Certain images can be selected therefrom as reference images which can be retrieved by the PMC 102 for purpose of comparison with an input image. Optionally, the image database can reside external to system 100, e.g., in one of the external data repositories, or in an external system or provider, and the reference images can be retrieved via the I/O interface 120. In some cases, the input image can be pre-acquired and stored in the image database 123 which can be retrieved by the PMC.

In certain embodiments, functional modules comprised in the PMC 102 can comprise a reference selection module 104, a segmentation module 106, and a comparison module 108. The functional modules comprised in the PMC are operatively connected with each other. The reference selection module 104 can be configured to select, from the image database, the set of reference images to be retrieved for the comparison with respect to a given input image, as will be described in further detail below with reference to FIG. 3. The segmentation module 106 can be configured to segment the input image into one or more input segments corresponding to one or more mechanical components comprised in the at least part of the vehicle using a segmentation model. In some embodiments, the set of reference images have been previously segmented (e.g., also by the segmentation module 106) in a similar manner. Therefore, upon retrieval of the reference images, each given reference image comprises at least one reference segment corresponding to at least one input segment of the one or more input segments, thereby obtaining a respective set of corresponding reference segments for each input segment of the at least one input segment.

Using the input of the input segment(s) and corresponding reference segment(s), the comparison module 108 can be configured to generate at least one difference map corresponding to the at least one input segment. Specifically, for each given input segment, the comparison module 108 can be configured to compare the given input segment with each corresponding reference segment within the respective set of reference segments thereof using a comparison model, giving rise to a set of difference map candidates each indicating probability of presence of difference of interest (DOI) between the given input segment and the corresponding reference segment. The DOI is representative of physical change of the vehicle. The comparison module 108 can then provide a difference map corresponding to the given input segment according to probability of each difference map candidate in the set of difference map candidates. The difference map as provided indicates probability of presence of DOI in the given input segment. Details of the segmentation and comparison are described below in further detail with reference to FIG. 2.

The I/O interface 120 can be configured to obtain, as input, the input image from the imaging device and/or the reference images from image database/data repository, and provide, as output, the at least one difference map corresponding to the at least one input segment indicating probability of presence of DOI therein. Optionally, system 100 can further comprise a graphical user interface (GUI) 124 configured to render for display of the input and/or the output to the user. Optionally, the GUI can be configured to enable user-specified inputs for operating system 100.

System 100 can be used for vehicle image comparison for various purposes and applications, such as, e.g., inspection and detection for anomalies, regular checkup and maintenance, etc. By way of example, for security purposes, system 100 can be used for detection of any illegal contraband, potential explosive and any visible mechanical modification to the vehicle. By way of another example, for general automotive purposes, system 100 can be used for detection of, e.g., rust, oil leakage, missing parts, change in tire condition, and any mechanical damages, such as dents, scratches etc. These comparison and detection applications can be done either with respect to previous scans of the same vehicle, or scans of similar vehicles (as described with reference to FIG. 3). It is to be appreciated that the present disclosure is not limited by any specific usage of the system.

When comparing an input image of a vehicle to any of previous references, there can be two types of differences appearing in the comparison result (e.g., represented by a difference map). One type of difference is the DOI difference which reflects real physical changes of the vehicle itself (as compared to the reference), such as, e.g., damages, anomalies, un-matching components, color changes, etc. The other type of difference refers to false alarm (FA) difference which is not indicative of real changes of the vehicle, but rather result from the fact that the two images (i.e., the input image and the reference image) are acquired under different imaging conditions. Imaging conditions that may cause FA type of differences can include one or more of the following: relative position between the vehicle and the imaging device, illumination condition, speed of the vehicle, and added spots (e.g., dirt) on the imaging device, etc.

By way of example, in cases where the imaging device is an underground camera that takes vehicle undercarriage images, it is possible that the input image and the reference image are taken when the vehicle passes the camera at two different relative positions (e.g., first time the vehicle may pass slightly towards the right side of the camera as compared to the second time), and/or with different speeds, such that the acquired images capture the undercarriage differently (e.g., the same component may look differently in the two images in terms of dimension, scale, shape, etc., due to the images being taken from different angles/perspectives, and/or a certain component/object may be revealed in one image but not in the other, etc.). By way of another example, different illumination conditions under which the two images are taken may result in different brightness of same components in the two images therefore affecting the comparison result. Thus, vehicle image comparison may impose many technical challenges as compared to comparison of other types of images, due to the above described factors.

One goal of the comparison as presently disclosed herein, is to be able to identify the DOI type of differences while excluding the FA differences in the comparison result. As aforementioned, image registration is commonly used in image analysis and comparison. However, known image registration techniques are rather cumbersome and cannot properly solve the above mentioned specific problems as caused in the specific case of vehicle image comparison. For instance, the known image registration technique may not work properly in these cases since the same vehicle component may look very differently in two images and thus may not be properly matched/registered.

By performing segmentation and comparison as will be described with reference to FIG. 2 below, and optionally a reference selection process as will be described with reference to FIG. 3 below, a more efficient comparison process with better comparison result (i.e., in terms of identifying DOI while excluding FA differences) can be achieved.

It is also noted that the system illustrated in FIG. 1 can be implemented in a distributed computing environment, in which the aforementioned functional modules shown in FIG. 1 can be distributed over several local and/or remote devices, and can be linked through a communication network.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware. The system in FIG. 1 can be a standalone network entity, or integrated, fully or partly, with other network entities. Those skilled in the art will also readily appreciate that the data repositories or storage unit therein can be shared with other systems or be provided by other systems, including third party equipment.

Figure 2:
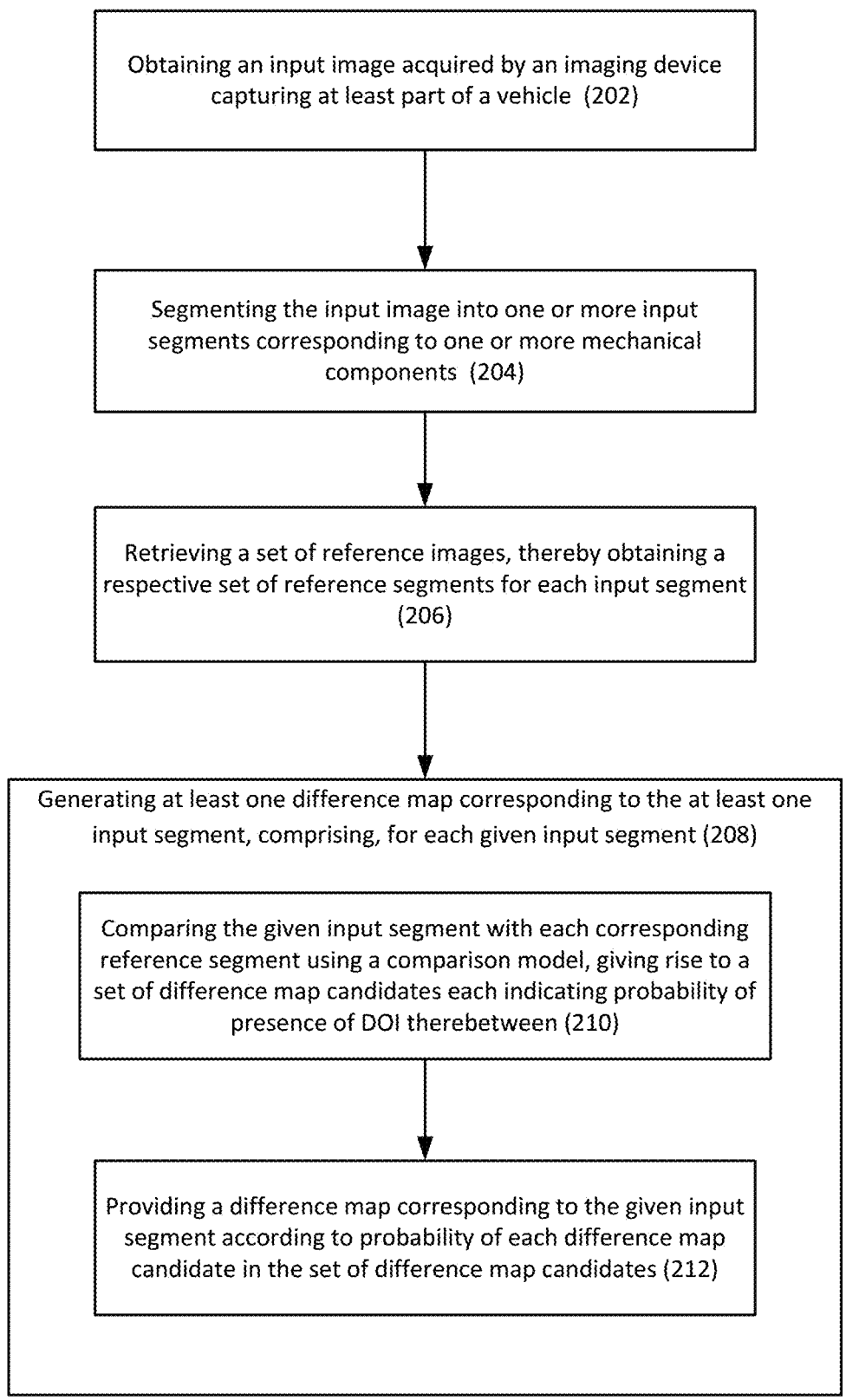
FIG. 2 illustrates a generalized flowchart of vehicle image comparison in accordance with certain embodiments of the presently disclosed subject matter.
Figure 3:
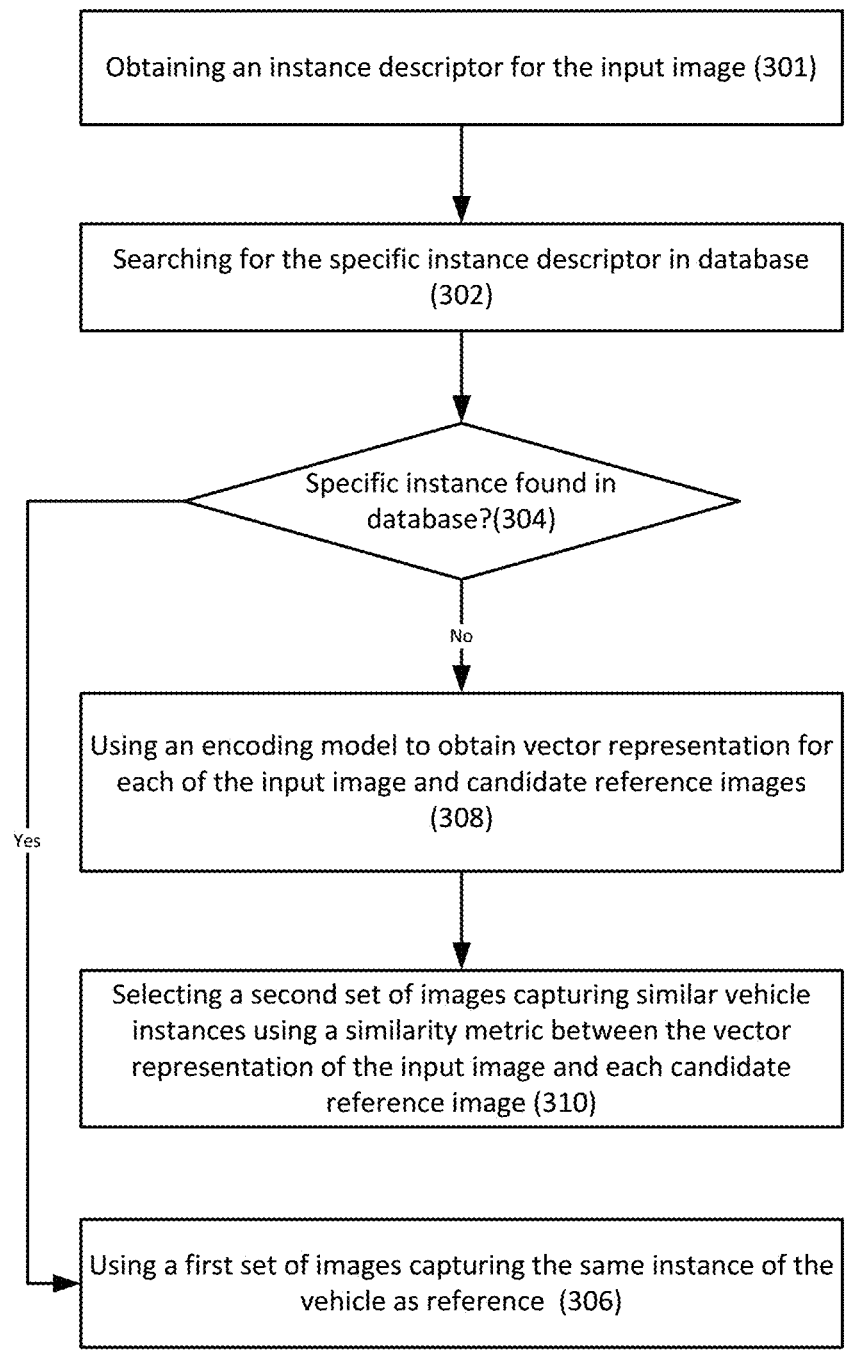
FIG. 3 illustrates a generalized flowchart of reference selection in accordance with certain embodiments of the presently disclosed subject matter.

While not necessarily so, the process of operation of system 100 can correspond to some or all of the stages of the methods described with respect to FIGS. 2-3. Likewise, the methods described with respect to FIGS. 2-3 and their possible implementations can be implemented by system 100. It is therefore noted that embodiments discussed in relation to the methods described with respect to FIGS. 2-3 can also be implemented, mutatis mutandis as various embodiments of the system 100, and vice versa.

Referring now to FIG. 2, there is illustrated a generalized flowchart of vehicle image comparison in accordance with certain embodiments of the presently disclosed subject matter.

An input image acquired by an imaging device can be obtained (e.g., by the PMC 102 via I/O interface 126, or from the image database 123, as illustrated in FIG. 1). The input image can capture at least part of a vehicle.

The term "input image" or "target image" used herein should be expansively construed to refer to any of the following: one or more still images acquired from one or more perspectives, sequence/series of images/frames acquired from a given perspective constituting video(s), and stitched/composite image(s) generated based on any of the above.

As aforementioned, in some embodiments, the input image can refer to one or more images captured by one image acquisition device from a given perspective/view/angle, such as, e.g., front, side (e.g., either left or right side), rear, top, and underside of a vehicle. The input image can therefore cover at least part of the vehicle exterior, depending on the specific perspective that the images are taken from, and the relative position between the image acquisition device and the vehicle. By way of example, an imaging device that is embedded underground of a passage that a vehicle passes by, can capture multiple undercarriage images at a given time interval (e.g., 100-250 frames per second). The multiple undercarriage images with overlapping field of view can be combined together to form a single stitched image of the vehicle undercarriage. Such a stitched image, which typically has a relatively high resolution, can be used as the input image. In some cases, such a stitched image can be a 3D image.

In some embodiments, the input image can refer to one or more images acquired by each of a plurality of imaging acquisition units located at different relative positions with respect to the vehicle. By way of example, still images can be acquired from different perspectives, and a composite image can be generated based on the multiple still images, which can be used as the input image to system 100. For instance, by using cameras surrounding the vehicle, a 3D vehicle model can be created and used as the input image. The 3D model, as well as the 3D image as mentioned above, can refer to a model or an image which contains additional information for each pixel indicating relative or absolute depth measure of the pixel with respect to the imaging device. In some cases, a 3D model or image can be created based on the captured 2D images, and one or more synthesized 2D images can be extracted from the 3D model or image. Such synthesized 2D images can be used as input for the comparison system 100 as disclosed herein rather than the captured 2D images. This can be advantageous in some cases for the purpose of compensating perspective differences (i.e., differences caused by point of view), since the synthesized 2D images can be generated from an estimated perspective that is closer/similar to the reference images, therefore enabling reducing the FA type differences.

Optionally, the functionality of generation of the stitched image or composite image as described above, or at least part thereof, can be integrated within the PMC 102. Alternatively, such functionality can be possibly provided by the imaging device, and the stitched image or composite image can be sent to the PMC via the I/O interface.

It is to be appreciated that the present disclosure is not limited by the number, type, coverage, and perspective of the input image as being taken, nor by the specific generation of methods thereof.

Upon obtaining the input image, the input image can be segmented (204) (e.g., by the Segmentation module 106 of PMC 102) into one or more input segments corresponding to one or more mechanical components comprised in the at least part of the vehicle using a segmentation model. It is to be noted that the partition of a vehicle into mechanical components may vary, e.g., it is possible that a certain mechanical component can be further partitioned into sub-components. Thus it is to be appreciated that the correspondence/mapping between the input segments and mechanical components are not fixed and can be adapted accordingly. For instance, one input segment can correspond to one or more mechanical components, or alternatively, one mechanical component can correspond to one or more input segments. The present disclosure is not limited by the specific partition of mechanical components and/or the correspondence between the input segments and mechanical components.

Figure 4:
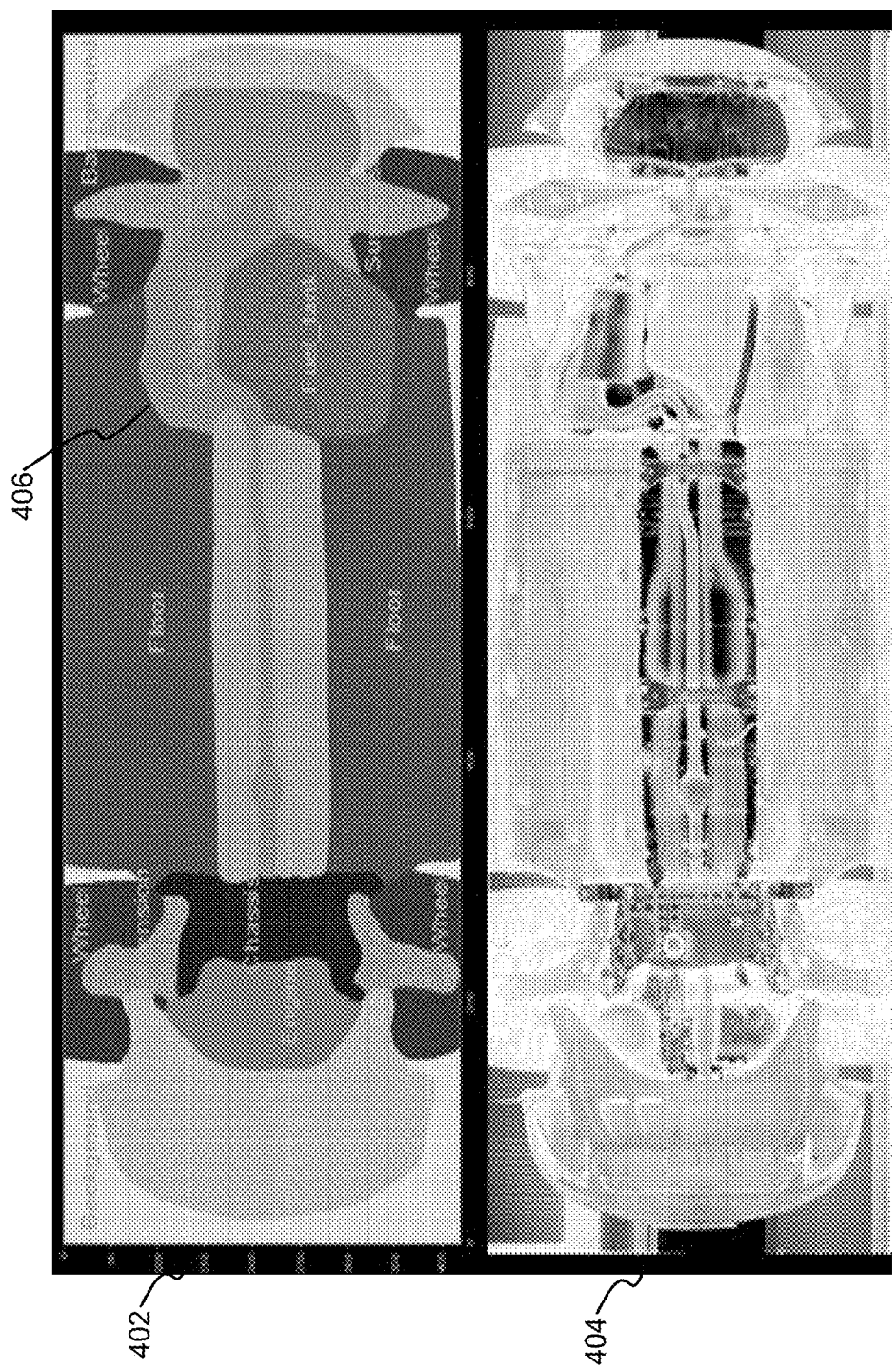
FIG. 4 illustrates an example of an input image and corresponding segments in accordance with certain embodiments of the presently disclosed subject matter.

FIG. 4 illustrates an example of an input image and corresponding segments in accordance with certain embodiments of the presently disclosed subject matter. As shown, the exemplary input image 404 captures the undercarriage of a vehicle. The input image 404 is segmented into multiple input segments as illustrated in 402. The segmentation is performed such that the segments in 402 correspond to the following exemplary mechanical components: exhaust, fuel tank, engine, wheel, suspension, and chassis, etc. Taking the segment 406 for example, in the current example, there is one segment 406 corresponding to the entire exhaust component. However, in other cases, the exhaust can be further divided into sub-components/parts, such as, e.g., one or more exhaust pipes, and the segment(s) can correspond to the sub-components, or to the entire component.

In some embodiments, the segmentation model can be based on machine learning. By way of example, the segmentation model can be implemented as a segmentation deep learning model, such as, e.g., a deep learning neural network (also referred to as deep neural network, or DNN). The segmentation deep learning model can be deemed as being comprised in the Segmentation module 106 of PMC 102.

DNN as referred to herein can refer to supervised or unsupervised DNN comprising a plurality of layers organized in accordance with respective DNN architecture. By way of not-limiting example, the layers of DNN can be organized in accordance with Convolutional Neural Network (CNN) architecture, Recurrent Neural Network architecture, Recursive Neural Networks architecture, GAN architecture or otherwise. Optionally, at least some of the layers can be organized in a plurality of DNN sub-networks. Each layer of DNN can include multiple basic computational elements (CE) typically referred to in the art as dimensions, neurons, or nodes.

Generally, CEs of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved. Optionally, at least part of the DNN subnetworks (if any) can be trained separately prior to training the entire DNN.

A set of DNN input data used to adjust the weights/thresholds of a deep neural network is referred to hereinafter as a training set or training dataset or training data.

It is noted that the teachings of the presently disclosed subject matter are not bound by the DNN architecture as described above.

In some embodiments, the segmentation deep learning model (e.g., the segmentation DNN) can be trained using a training dataset comprising a set of pre-segmented vehicle images according to mechanical components comprised therein. The training images and the segmented labels are input into the segmentation DNN for training. The training process is to optimize the model so that it can correctly predict segmentation label (e.g., pixel-wise segmentation label) of an input image. In some cases, different training datasets covering images of various types of vehicles need to be provided so as to train the model to be able to segment different types of incoming vehicles in runtime.

Continuing with the flow of FIG. 2, a set of reference images can be retrieved (206) (e.g., by the Reference selection module 104 of the PMC 102).

Referring now to FIG. 3, there is illustrated a generalized flowchart of reference selection in accordance with certain embodiments of the presently disclosed subject matter.

The set of reference images are selected using an instance descriptor. The instance descriptor can be a unique identifier of a vehicle instance in an image. By way of example, the instance descriptor can be obtained/generated by using license plate recognition. By way of another example, a manual entry of a identifier can be used as an instance descriptor. In some cases, a fingerprint representative of specific features of the vehicle instance in the image can be created and used as the instance descriptor. By way of example, the specific features can refer to one or more structural characteristics of elements/components/patterns within the image, such as, e.g., shape, size, location of elements, and geometrical relations and relative positions between elements, etc. Additionally or alternatively, the location and time of the acquisition of the input image can also be used as part of the identifier information. Accordingly, a specific instance descriptor is obtained (301) for the input image using any of the above described methods.

A search of the specific instance descriptor is performed (302) in the image database (e.g., the image database 123 in FIG. 1) where previous scans of various vehicle instances (i.e., candidate reference images) are stored together with their unique instance descriptors associated therewith. The search is to determine whether the specific vehicle instance in the input image (as represented by the specific instance descriptor) can be found (304) in the database. If the specific instance is found, a first set of images associated with the same specific instance descriptor, thus capturing the same vehicle instance, are retrieved and used (306) as reference images for comparison with the input image. If the specific instance is not found (or alternatively, if the references found in 306 are insufficient, such as, e.g., too few references, poor scan quality of references, poor perspective of view, etc.), a similarity metric can be used to seek for alternative or additional references (i.e., a second set of images capturing similar vehicle instances).

Specifically, an encoding model can be used (308) to obtain vector representation for each of the input image and candidate reference images. In some embodiments, the encoding model can be based on machine learning. By way of example, the encoding model can be implemented as an encoding deep learning model, such as, e.g., an encoding DNN. The encoding DNN can be deemed as being comprised in the Reference selection module 104 of PMC 102. The general description of DNN architecture and implementation is described in detail above and thus will not be repeated here for purpose of brevity and conciseness of the description.

A second set of images capturing similar vehicle instances can be selected (310) using a similarity metric between the vector representation of the input image and each candidate reference image. The similarity metric can be any known measure or function that can be used to quantify the similarity between two objects/instances, such as, e.g., any distance functions (e.g., L1-norm, L2-norm, etc.). Specifically, the encoding DNN can be trained and optimized such that the distance between vector representation of all similar instances is smaller than the distance to any non-similar instances.

Due to the above mentioned technical challenges of vehicle image comparison, it can be recognized that the input image can be regarded as acquired by the imaging device at a first imaging condition, and at least one reference image within the set of reference images can be regarded as acquired at a second imaging condition different from the first imaging condition, thereby causing false alarm (FA) difference between the input image and the at least one reference image resulting from difference between the first and second imaging conditions. Therefore, in order to achieve an ideal comparison result, it is needed to identify the DOI while excluding FA differences.

Since the set of reference images as selected have been previously segmented into reference segments corresponding to the mechanical components as comprised therein, in some cases it is possible that the reference segments of a given reference image do not exactly correspond to the input segments of the input image. For instance, there may be one or more input segments that do not have corresponding reference segments, or vice versa. In such cases, it is needed to perform a matching between the reference segments and the input segments, and any discrepancies resulting from non-matching segments can be identified as DOI differences. For instance, any non-matching input segments (e.g., missing or extra input segments in the input image as compared to the reference segments) identified in the matching can be marked as presence of DOI, and can be included in the comparison result (e.g., by combining it with the difference map as generated with reference to block 208) to be reported to the user.

After the matching, each reference image within the set comprises at least one reference segment corresponding to at least one input segment of the one or more input segments (as comprised in the input image). Thus, for each input segment of the at least one input segment, a respective set of corresponding reference segments are obtained.

Referring back to the flowchart of FIG. 2, at least one difference map corresponding to the at least one input segment can be generated (e.g., by the Comparison module 108 of PMC 102). Specifically, generation of the at least one difference map can comprise, for each given input segment, comparing (210) the given input segment with each corresponding reference segment within the respective set of reference segments thereof using a comparison model, giving rise to a set of difference map candidates each indicating probability of presence of DOI between the given input segment and the corresponding reference segment, and providing (212) a difference map corresponding to the given input segment according to probability of each difference map candidate in the set of difference map candidates. The DOI refers to the type of differences that are of the user's interest. In some embodiments, the DOI can be representative of physical change of the vehicle itself, including but not limited to damages such as e.g., scratches, anomalies such as suspected objects, color changes, etc. The difference map as obtained in 212 can provide an indication of probability of presence of DOI in the given input segment.

In particular, when comparing the given input segment with each corresponding reference segment, a comparison model is used. In some embodiments, the comparison model can be based on machine learning. By way of example, the comparison model can be implemented as a comparison deep learning model, such as, e.g., a comparison DNN. For instance, the comparison DNN can be implemented as a Siamese neutral network. The comparison DNN can be deemed as being comprised in the comparison module 108 of PMC 102. The general description of DNN architecture and implementation is described in detail above thus will not be repeated here for purpose of brevity and conciseness of the description.

The comparison DNN can be trained using a training dataset comprising a set of image pairs each including a target image and a reference image for which DOI differences are pre-identified. The model is trained so as to be capable of identifying DOI and excluding the FA difference in a difference map generated between each image pair. In some embodiments, target images as provided to the training process can include synthetic simulated images. The simulated images are generated for the purpose of simulating different kinds of DOIs to be embedded in the target images, such as suspected objects, etc., so that the model can be trained to identify such anomalies in runtime.

In some embodiments, each difference map candidate in the set of difference map candidates can indicate segment-wise probability of presence of DOI between the given input segment and the corresponding reference segment. In such cases, the difference map as provided in block 212 is selected from the set of difference map candidates according to ranking of the probability of each difference map candidate in the set. By way of example, the segment-wise probability can be represented by a numerical value within a range of [0, 1] for each given segment, with 1 indicating most likely there is presence of DOI in the given input segment and 0 indicating otherwise. It is appreciated that other kinds of representation of probability and/or ranges can be used in lieu of the above.

In some further embodiments, each difference map candidate in the set of difference map candidates can indicate pixel-wise probability of presence of DOI between the given input segment and the corresponding reference segment. In such cases, the difference map as provided in block 212 can be generated based on the set of difference map candidates. Each pixel value in the difference map can be determined based on a corresponding pixel value in each difference map candidate in the set. Similarly, the pixel-wise probability can be represented by a numerical value within a range of [0, 1] for each pixel in the given input segment, with 1 indicating most likely there is presence of DOI in the given pixel and 0 indicating otherwise. By way of example, a given pixel value in the difference map can be selected, from all corresponding pixel values in the difference map candidates, as the pixel value that indicates a best probability. By way of another example, the pixel value can be generated using an averaging algorithm on all or some of the corresponding pixel values. The averaging algorithm can be based on any known averaging schemes which can average among a set of values, such as, mean, median, mode, etc. In such cases, the difference map as generated for each input segment can be a composite comparison result in which at least some of the pixels result from comparisons with different reference images. For instance, in the above case where a given pixel value in the difference map is selected as the corresponding pixel that indicates a best probability, as a matter of fact, each pixel in the difference map results from a comparison with a corresponding pixel in a respective reference segment that gives the best probability.

For exemplary purpose only, assume there are a set of reference segments 1-5 for a given input segment A in an input image. After comparison with each of the five references, there are five difference map candidates generated indicating pixel-wise probability of presence of DOI. When generating a difference map based on the five candidates, each pixel can be selected from five corresponding pixels in the five candidates, or generated based on the five corresponding pixel values. In the former case, it is possible that in the resulting difference map, pixel 1 is selected from a corresponding pixel in candidate 3 which resulted from comparison with reference 3, since that pixel indicates a best probability of DOI, while pixel 2 may be selected from a corresponding pixel in candidate 5 which resulted from comparison with reference 5, etc.

Once a difference map for each input segment is generated, each difference map of the at least one difference map can be either presented to the user (e.g., through the GUI 124) individually, or alternatively, the at least one difference map can be combined to a composite difference map indicating probability of presence of DOI in the entire input image, and the composite difference map can be presented to the user. In some cases, if there are non-matching input segments identified in the matching process as described above, these non-matching input segments can be combined with the composite difference map and provided to the user to review.

Figure 5:
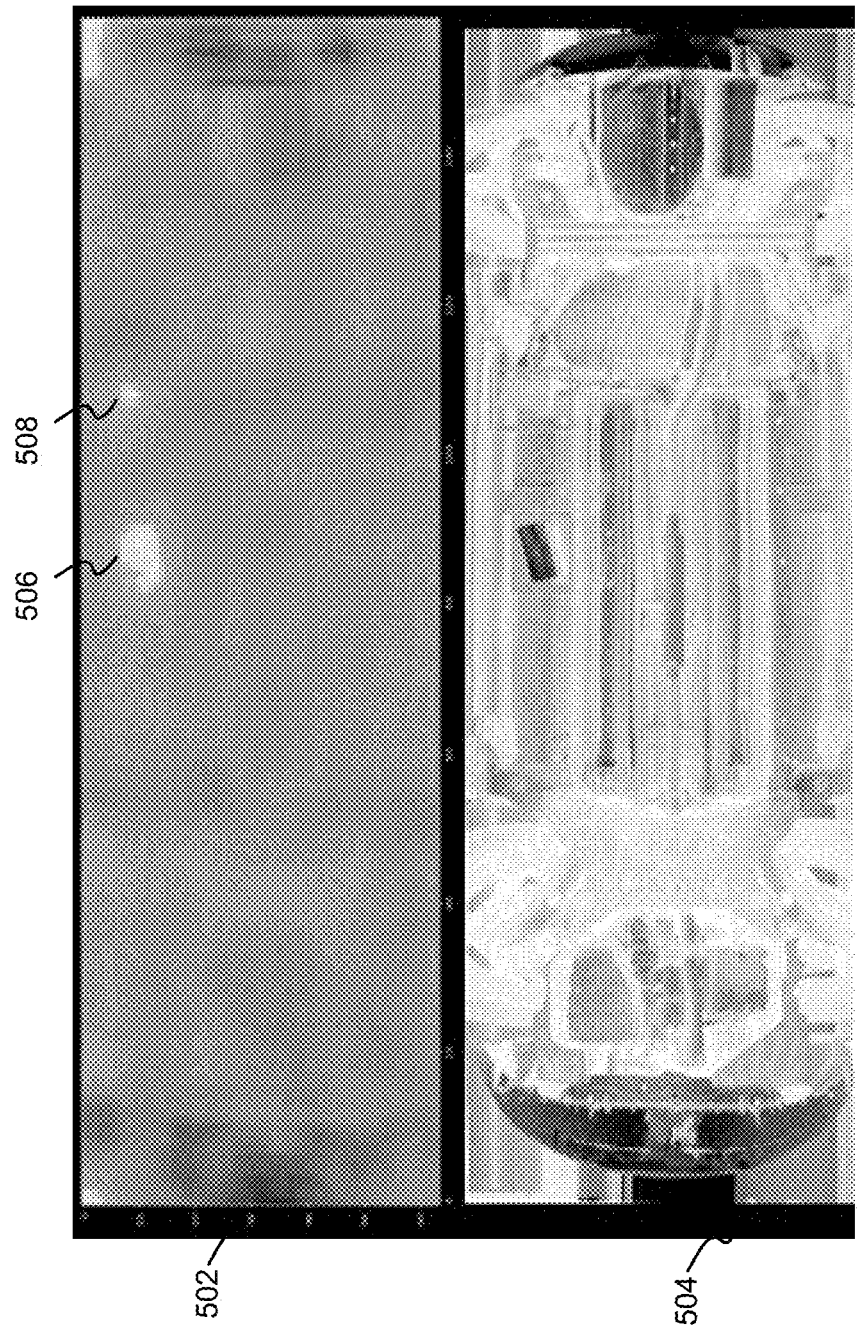
FIG. 5 illustrates an example of a composite difference map and a corresponding input image in accordance with certain embodiments of the presently disclosed subject matter.

FIG. 5 illustrates an example of a composite difference map and a corresponding input image in accordance with certain embodiments of the presently disclosed subject matter.

After an exemplary input image 504 goes through the flow as illustrated in FIG. 2, one or more difference maps corresponding to segments/components are generated and then combined into a composite difference map 502. As shown, two DOIs 506 and 508 can be identified from the composite difference map which correspond to two suspected objects in the input image (as squared).

It is appreciated that the examples and embodiments illustrated with reference to the comparison in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of vehicle image comparison, comprising:
    obtaining an input image acquired by an imaging device capturing at least part of a vehicle;
    segmenting the input image into one or more input segments corresponding to one or more mechanical components comprised in the at least part of the vehicle using a segmentation model;
    retrieving a set of reference images, wherein each reference image within the set comprises at least one reference segment corresponding to at least one input segment of the one or more input segments, thereby obtaining a respective set of corresponding reference segments for each input segment of the at least one input segment; and
    generating at least one difference map corresponding to the at least one input segment, comprising, for each given input segment:
        comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and
        providing a difference map corresponding to the given input segment according to probability of each difference map candidate in the set of difference map candidates, the difference map indicating probability of presence of DOI in the given input segment.

2. The computerized method of claim 1, further comprising combining the at least one difference map to a composite difference map indicating probability of presence of DOI in the input image.

3. The computerized method of claim 1, wherein the input image is acquired by the imaging device at a first imaging condition, and wherein at least one reference image within the set of reference images is acquired at a second imaging condition different from the first imaging condition, thereby causing false alarm (FA) difference between the input image and the at least one reference image resulting from difference between the first and second imaging conditions.

4. The computerized method of claim 3, wherein the first and second imaging conditions comprise one or more of the following: relative position between the vehicle and the imaging device, illumination condition, and speed of the vehicle.

5. The computerized method of claim 1, wherein the set of reference images are retrieved using an instance descriptor uniquely identifying the vehicle in the input image.

6. The computerized method of claim 5, wherein the set of reference images are selected from a group comprising: a first set of images capturing the same instance of the vehicle, and a second set of images capturing similar instances of the vehicle.

7. The computerized method of claim 6, wherein the second set of images are selected by: using an encoding model to obtain vector representation for each of the input image and candidate reference images, and selecting the second set of images using a similarity metric between the vector representation of the input image and each candidate reference image.

8. The computerized method of claim 1, wherein the segmentation model is a segmentation deep learning model trained using a training dataset comprising a set of pre-segmented vehicle images according to mechanical components comprised therein.

9. The computerized method of claim 1, wherein the comparison model is a comparison deep learning model trained using a training dataset comprising a set of image pairs each including a target image and a reference image so as to be capable of identifying the DOI and excluding the FA difference in a difference map between each image pair.

10. The computerized method of claim 1, wherein each difference map candidate in the set of difference map candidates indicate segment-wise probability of presence of DOI between the given input segment and the corresponding reference segment, and wherein the providing comprises selecting a difference map from the set of difference map candidates according to ranking of the probability of each difference map candidate in the set.

11. The computerized method of claim 1, wherein each difference map candidate in the set of difference map candidates indicate pixel-wise probability of presence of DOI between the given input segment and the corresponding reference segment, and wherein the providing comprises generating a difference map in which each pixel value is determined based on a corresponding pixel value in each difference map candidate in the set.

12. The computerized method of claim 11, wherein at least some of the pixels in the difference map result from comparisons with different reference images.

13. The computerized method of claim 1, wherein each reference image within the set comprises one or more reference segments, and the method further comprises for each reference image, performing a matching between the input segments and the reference segments to identify the at least one reference segment that corresponds to the at least one input segment.

14. The computerized method of claim 13, further comprising marking one or more non-matching input segments identified in the matching as presence of DOI.

15. A computerized system of vehicle image comparison, the system comprising a processor and memory circuitry (PMC) operatively connected to an I/O interface, wherein:
    the I/O interface is configured to obtain an input image acquired by an imaging device capturing at least part of a vehicle; and
    the PMC is configured to:
    segment the input image into one or more input segments corresponding to one or more mechanical components comprised in the at least part of the vehicle using a segmentation model;
    retrieve a set of reference images, wherein each reference image within the set comprises at least one reference segment corresponding to at least one input segment of the one or more input segments, thereby obtaining a respective set of corresponding reference segments for each input segment of the at least one input segment; and generate at least one difference map corresponding to the at least one input segment, comprising, for each given input segment:

comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and providing a difference map corresponding to the given input segment according to probability of each difference map candidate in the set of difference map candidates, the difference map indicating probability of presence of DOI in the given input segment.

16. The computerized system of claim 15, wherein the PMC is further configured to combine the at least one difference map to a composite difference map indicating probability of presence of DOI in the input image.

17. The computerized system of claim 15, wherein the input image is acquired by the imaging device at a first imaging condition, and wherein at least one reference image within the set of reference images is acquired at a second imaging condition different from the first imaging condition, thereby causing false alarm (FA) difference between the input image and the at least one reference image resulting from difference between the first and second imaging conditions.

18. The computerized system of claim 17, wherein the first and second imaging conditions comprise one or more of the following: relative position between the vehicle and the imaging device, illumination condition, and speed of the vehicle.

19. The computerized system of claim 15, wherein the PMC is further configured to retrieve the set of reference images using an instance descriptor uniquely identifying the vehicle in the input image.

20. The computerized system of claim 19, wherein the set of reference images are selected from a group comprising: a first set of images capturing the same instance of the vehicle, and a second set of images capturing similar instances of the vehicle.

21. The computerized system of claim 20, wherein the set of reference images are selected as the second set of images, and wherein the second set of images are retrieved by: using an encoding model to obtain vector representation for each of the input image and candidate reference images, and selecting the second set of images using a similarity metric between the vector representation of the input image and each candidate reference image.

22. The computerized system of claim 15, wherein the segmentation model is a segmentation deep learning model trained using a training dataset comprising a set of pre-segmented vehicle images according to mechanical components comprised therein.

23. The computerized system of claim 15, wherein the comparison model is a comparison deep learning model trained using a training dataset comprising a set of image pairs each including a target image and a reference image so as to be capable of identifying the DOI and excluding the FA difference in a difference map between each image pair.

24. The computerized system of claim 15, wherein each difference map candidate in the set of difference map candidates indicates segment-wise probability of presence of DOI between the given input segment and the corresponding reference segment, and wherein the providing comprises selecting a difference map from the set of difference map candidates according to ranking of the probability of each difference map candidate in the set.

25. The computerized system of claim 15, wherein each difference map candidate in the set of difference map candidates indicates pixel-wise probability of presence of DOI between the given input segment and the corresponding reference segment, and wherein the providing comprises generating a difference map in which each pixel value is determined based on a corresponding pixel value in each difference map candidate in the set.

26. The computerized system of claim 25, wherein at least some of the pixels in the difference map result from comparisons with different reference images.

27. The computerized system of claim 15, wherein each reference image within the set comprises one or more reference segments, and the PMC is further configured to, for each reference image, perform a matching between the input segments and the reference segments to identify the at least one reference segment that corresponds to the at least one input segment.

28. The computerized system of claim 27, wherein the PMC is further configured to mark one or more non-matching input segments identified in the matching as presence of DOI.

29. A non-transitory computer readable medium comprising instructions that, when executed by a computer, cause the computer to perform a method of vehicle image comparison, the method comprising:

obtaining an input image capturing at least part of a vehicle;

segmenting the input image into one or more input segments corresponding to one or more mechanical components comprised in the at least part of the vehicle using a segmentation model;

retrieving a set of reference images, wherein each reference image within the set comprises at least one reference segment corresponding to at least one input segment of the one or more input segments, thereby obtaining a respective set of corresponding reference segments for each input segment of the at least one input segment; and generating at least one difference map corresponding to the at least one input segment, comprising, for each given input segment:

comparing the given input segment with each corresponding reference segment within the respective set of reference segments thereof using a comparison model, giving rise to a set of difference map candidates each indicating probability of presence of difference of interest (DOI) between the given input segment and the corresponding reference segment, the DOI representative of physical change of the vehicle; and providing a difference map corresponding to the given input segment according to probability of each difference map candidate in the set of difference map candidates, the difference map indicating probability of presence of DOI in the given input segment.

* * * * *